United States Patent
Wang et al.

(10) Patent No.: US 12,289,783 B2
(45) Date of Patent: Apr. 29, 2025

(54) MOBILITY MANAGEMENT METHOD AND TERMINAL

(71) Applicant: GUANGDONG OPPO MOBILE TELECOMMUNICATIONS CORP., LTD., Guangdong (CN)

(72) Inventors: Shukun Wang, Guangdong (CN); Yang Xu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 468 days.

(21) Appl. No.: 17/565,444

(22) Filed: Dec. 29, 2021

(65) Prior Publication Data
US 2022/0124594 A1 Apr. 21, 2022

Related U.S. Application Data

(63) Continuation of application No. PCT/CN2019/094916, filed on Jul. 5, 2019.

(51) Int. Cl.
*H04W 76/19* (2018.01)
*H04W 36/32* (2009.01)
(Continued)

(52) U.S. Cl.
CPC ......... *H04W 76/19* (2018.02); *H04W 36/322* (2023.05); *H04W 60/04* (2013.01); *H04W 68/005* (2013.01); *H04W 76/30* (2018.02)

(58) Field of Classification Search
CPC ... H04W 36/32; H04W 60/04; H04W 68/005; H04W 76/19; H04W 76/30;
(Continued)

(56) References Cited

U.S. PATENT DOCUMENTS

| | | | | |
|---|---|---|---|---|
| 2013/0157662 | A1* | 6/2013 | Han | H04W 48/18 455/436 |
| 2015/0245309 | A1 | 8/2015 | Nayak et al. | |

(Continued)

FOREIGN PATENT DOCUMENTS

| | | |
|---|---|---|
| CN | 101188835 A | 5/2008 |
| CN | 101217746 A | 7/2008 |

(Continued)

OTHER PUBLICATIONS

International Search Report in the international application No. PCT/CN2019/094916, mailed on Feb. 3, 2020.
(Continued)

*Primary Examiner* — Joseph E Avellino
*Assistant Examiner* — Adam Joel Cerlanek
(74) *Attorney, Agent, or Firm* — Ladas & Parry LLP

(57) ABSTRACT

Provided are a mobility management method and apparatus, and a terminal. The method comprises: a terminal determining that the mobility management of a first subscriber identification module and of a second subscriber identification module can be subjected to joint processing; and the terminal sending first indication information to a network side, wherein the first indication information is used for indicating that the mobility management of the first subscriber identification module and of the second subscriber identification module can be subjected to joint processing.

16 Claims, 3 Drawing Sheets

---

A terminal determines that mobility management of a first subscriber identification card and a second subscriber identification card can be processed combinedly — 201

The terminal transmits first indication information to a network side, the first indication information is used to indicate that the mobility management of the first subscriber identification card and the second subscriber identification card can be processed combinedly — 202

(51) Int. Cl.
*H04W 60/04* (2009.01)
*H04W 68/00* (2009.01)
*H04W 76/30* (2018.01)

(58) Field of Classification Search
CPC ... H04W 36/322; H04W 68/02; H04W 76/27; H04W 8/183; H04W 48/18; H04W 60/005; H04W 88/06; H04W 8/02
See application file for complete search history.

(56) References Cited

U.S. PATENT DOCUMENTS

| | | | |
|---|---|---|---|
| 2018/0220293 A1* | 8/2018 | Huang | H04W 8/183 |
| 2019/0007992 A1* | 1/2019 | Kim | H04W 76/27 |
| 2019/0182897 A1* | 6/2019 | Jain | H04W 4/80 |
| 2020/0077469 A1 | 3/2020 | Jain et al. | |
| 2020/0260523 A1* | 8/2020 | Sun | H04W 76/40 |
| 2020/0396591 A1* | 12/2020 | Ou | H04W 76/30 |
| 2021/0282103 A1 | 9/2021 | Zhu | |
| 2021/0410107 A1* | 12/2021 | Park | H04W 68/02 |
| 2022/0240213 A1* | 7/2022 | Ly | H04W 48/18 |

FOREIGN PATENT DOCUMENTS

| | | | | |
|---|---|---|---|---|
| CN | 101247596 A | 8/2008 | | |
| CN | 109068404 A | 12/2018 | | |
| EP | 2437528 B1 | 7/2013 | | |
| WO | WO-2015180128 A1 * | 12/2015 | | H04W 4/02 |
| WO | WO-2018141148 A1 * | 8/2018 | | H04W 24/10 |

OTHER PUBLICATIONS

Supplementary European Search Report in the European application No. 19937015.6, mailed on May 25, 2022.
English translation of the Written Opinion of the International Search Authority in the international application No. PCT/CN2019/094916, mailed on Feb. 3, 2020.
First Office Action of the Chinese application No. 201980092888.7, issued on Dec. 28, 2023, 20 pages with English translation.
Decision of Rejection of the Chinese application No. 201980092888.7, issued on Jul. 30, 2024. 14 pages with English translation.

* cited by examiner

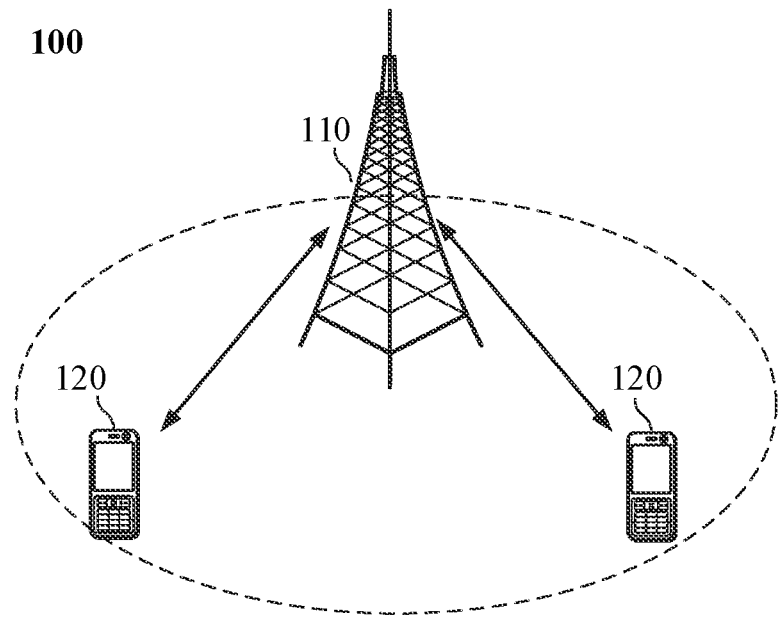

FIG. 1

```
┌─────────────────────────────────────────────────────────────┐
│ A terminal determines that mobility management of a first    │  201
│ subscriber identification card and a second subscriber       │
│ identification card can be processed combinedly              │
└─────────────────────────────────────────────────────────────┘
                              │
                              ▼
┌─────────────────────────────────────────────────────────────┐
│ The terminal transmits first indication information to a     │  202
│ network side, the first indication information is used to    │
│ indicate that the mobility management of the first           │
│ subscriber identification card and the second subscriber     │
│ identification card can be processed combinedly              │
└─────────────────────────────────────────────────────────────┘
```

FIG. 2

MOBILITY MANAGEMENT METHOD AND TERMINAL

CROSS REFERENCE TO RELATED APPLICATION

This is a continuation of International Application No. PCT/CN2019/094916, filed on Jul. 5, 2019, and entitled "MOBILITY MANAGEMENT METHOD AND APPARATUS, AND TERMINAL", which claims priority to the disclosure of which is hereby incorporated by reference in its entirety.

TECHNICAL FIELD

Embodiments of the present disclosure relate to the technical field of mobile communication, and in particular to a method and apparatus for mobility management, and a terminal.

BACKGROUND

A dual-card dual-standby mode is that one terminal can simultaneously be inserted with two subscriber identification cards, both of which are in a standby state. A dual-network dual-standby mode is that one terminal can simultaneously be inserted with two subscriber identification cards with different networks, both of which are in the standby state. Whether the terminal in the dual-card dual-standby mode or in the dual-network dual-standby mode, the mobility management of two subscriber identification cards is performed independently. In some cases, redundant mobility behavior may be caused, which is not conducive to energy saving of the terminal.

BRIEF DESCRIPTION OF THE DRAWINGS

The accompanying drawings described herein are intended to provide a further understanding of the present disclosure and form a part of the present disclosure. The illustrative embodiments of the present disclosure and the description thereof are intended to explain the present disclosure, and do not constitute an improper limitation of the present disclosure.

FIG. 1 is a schematic diagram of a communication system architecture according to an embodiment of the present disclosure.

FIG. 2 is a flowchart of a method for mobility management according to an embodiment of the present disclosure.

DETAILED DESCRIPTION

Figure 3:
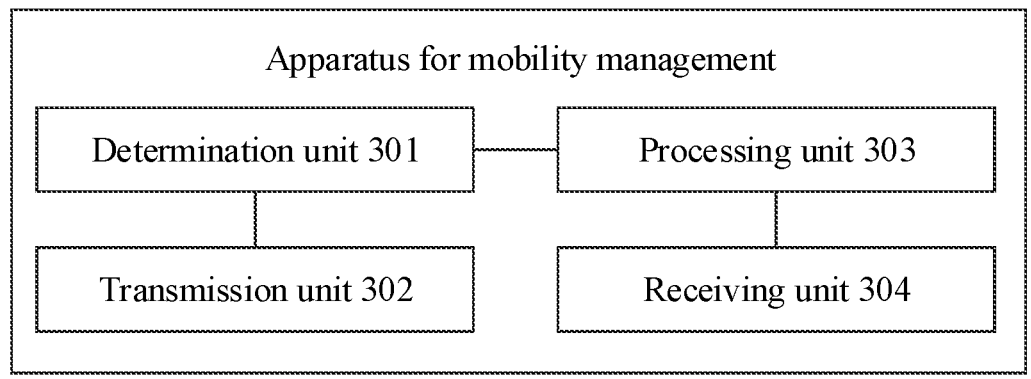
FIG. 3 is a schematic structural diagram of an apparatus for mobility management according to an embodiment of the present disclosure.

The technical solutions of the embodiments of the present disclosure will be described below in conjunction with the accompanying drawings in the embodiments of the present disclosure. It will be clear that the described embodiments may be a part of the embodiments of the present disclosure, but not all of them. Based on the embodiments in the present disclosure, all other embodiments obtained by those of ordinary skill in the art without making creative efforts will fall within the scope of protection of the present disclosure.

The technical solutions of the embodiments of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunications System (UMTS) system, a Worldwide Interoperability for Microwave Access (WiMAX) communication system, or a 5G system.

Exemplarily, the communication system 100 to which the embodiments of the present disclosure are applied is shown in FIG. 1. The communication system 100 may include a network device 110, which may be a device that communicates with a terminal 120 (or referred to as a communication terminal, a terminal). The network device 110 may provide communication coverage for a particular geographic area and may communicate with terminals located within the coverage area. Alternatively, the network device 110 may be a Base Transceiver Station (BTS) in a GSM system or a CDMA system. The network device 110 may be a NodeB (NB) in the WCDMA system, or may be an Evolutional Node B (eNB or eNodeB) in an LTE system. The network device 110 may be a radio controller in a Cloud Radio Access Network (CRAN), or may be a mobile switching center, a relay station, an access point, a vehicle-mounted device, a wearable device, a hub, a switch, a bridge, a router, a network-side device in a 5G network, a network device in a future evolved Public Land Mobile Network (PLMN), or the like.

The communication system 100 may further include at least one terminal 120 located within the coverage of the network device 110. The term "terminal" used herein may include, but may be not limited to, connection via wired lines, such as via a Public Switched Telephone Networks (PSTN), a Digital Subscriber Line (DSL), a digital cable, a direct cable connection; and/or via another data connection/network; and/or via a wireless interface, e.g., for a cellular network, a wireless local area network, a digital television network (such as a DVB-H network, a satellite network, an AM-FM broadcast transmitter); and/or via a device of another terminal arranged to receive/transmit a communication signal; and/or via an Internet of Things (IoT) device. A terminal arranged to communicate through a wireless interface may be referred to as a "wireless communication terminal", a "wireless terminal", or a "mobile terminal". Examples of the mobile terminal may include, but may be not limited to, a satellite or cellular phone, a Personal Communications System (PCS) terminal that can combine a cellular radio telephone with data processing, facsimile, and data communication capabilities, a PDA that may include a radio telephone, a pager, an Internet/Intranet access, a web browser, a notebook, a calendar, and/or a Global Positioning System (GPS) receiver, and a conventional laptop and/or a palmtop receiver or other electronic devices including a radiotelephone transceiver. A terminal may refer to an access terminal, a user equipment (UE), a subscriber unit, a subscriber station, a mobile station, a mobile stage, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, an in-vehicle device, a wearable device, a terminal in a 5G network, a terminal in a future evolved PLMN, or the like.

Alternatively, Device to Device (D2D) communication may be performed between multiple terminals 120.

Alternatively, a 5G system or 5G network may also be referred to as a New Radio (NR) system or a NR network.

FIG. 1 illustrates one network device and two terminals. Alternatively, the communication system 100 may include a plurality of network devices, and other numbers of terminals may be included within a coverage area of each of the network devices, which is not limited in the embodiments of the present disclosure.

Alternatively, the communication system 100 may further include a network controller, a mobility management entity, and other network entities, which are not limited in the embodiments of the present disclosure.

It should be understood that a device with a communication function in a network/system in the embodiments of the present disclosure may be referred to as a communication device. Taking the communication system 100 shown in FIG. 1 as an example, the communication device may include a network device 110 and a terminal 120 with a communication function. The network device 110 and the terminal 120 may be specific devices described above, and details are not described herein. The communication device may further include other devices in the communication system 100, such as a network controller, a mobility management entity, and other network entities, which are not limited in this embodiment of the present disclosure.

It should be understood that the terms "system" and "network" are used herein only to describe an association relationship of the associated objects, indicating that there may be three relationships, for example, A and/or B, which may indicate a presence of A alone, a presence of both A and B, and a presence of B alone. In addition, the character "/" herein may generally indicate that the association relationship of the associated objects is an "or" relationship.

To facilitate understanding of the technical solutions of the embodiments of the present disclosure, the technical solutions related to the embodiments of the present disclosure are described below.

Three RRC States

In a 5G network environment, a new Radio Resource Control (RRC) state (i.e., an RRC Inactive (RRC_INACTIVE) state) may be defined for a purpose of reducing air interface signaling and rapidly resuming wireless connections and data services. The RRC_INACTIVE state is different from an RRC_IDLE state and an RRC_CONNECTED state.

The following may describe three RRC states in the 5G network environment.

1) In the RRC_IDLE state (hereinafter referred to as an idle state for short), the mobility may be a cell selection and reselection based on a UE, a paging may be initiated by a Core Network (CN), and a paging area may be configured by the CN. There is no UE AS context on the base station side. There is no RRC connection.

2) In the RRC_CONNECTED state (hereinafter referred to as a connected state), there may be the RRC connection, and the UE AS context between the base station and the UE. The network side may know the UE location at a specific cell level. The mobility may be controlled by the network side. Unicast data may be transmitted between the UE and the base station.

3) In the RRC_INACTIVE state (hereinafter referred to as an inactive state), the mobility may be the cell selection and reselection based on the UE, there may be a connection between the Radio Access Network (RAN) and the core network (CN). The UE AS context may exist in a certain base station, the paging may be triggered by the RAN, the paging area based on the RAN may be managed by the RAN, and the network side may know that the UE location is based on a level of the paging area based on the RAN.

Characteristics of Inactive State

When the UE is in the inactive state, there may be the following characteristics: 1) the connection between the RAN and the CN may be maintained; 2) the UE and at least one base station may save the AS context; 3) the UE may be reachable for the RAN side, and the related parameters may be configured by the RAN; 4) the network side may be not required to be notified when the UE moves in the RAN Notification Area (RNA) which is configured by the RAN, but the network side may be required to be notified when the UE moves out of the RNA; 5) UE may move within the RNA according to the cell selection and reselection mode.

When the UE is in the inactive state, the UE may be triggered to return to the idle state in the following conditions: 1) in response to the initial CN paging message being received; 2) in response to expiration of the timer T319 after starting the timer T319 when initiating the RRC resume request; 3) in response to a failure of the verification for MSG4 integrity protection; 4) in response to the cell reselection of another Radio Access Technology (RAT); and 5) in response to entering a state of camping in any cell.

When the UE is in the inactive state, the network side may configure the inactive-state configuration parameters for the UE through the RRC dedicated signaling (e.g., the RRC release message). The main configuration parameters may include (1) an Inactive Radio Network Temporary Identifier (I-RNTI). The I-RNTI may be used to identify the inactive-state context of the UE on the base station side, and the I-RNTI may be unique within the base station. The main configuration parameters may further include (2) a RNA, and the RNA may be used to control the area where the UE performs cell reselection in the inactive state, i.e., the paging range area of the RAN initial paging. The main configuration parameters may further include 3) a RAN Discontinuous Reception cycle (RAN DRX cycle), and the RAN DRX cycle may be used to calculate the paging occasion of the RAN initial paging. The main configuration parameters may further include 4) a RRNA Update periodicity (RNAU periodicity), and the RNAU periodicity may be used to control the period in which the UE performs periodic RAN location update. The main configuration parameters may further include 5) a Next hop Chaining Counter (NCC), and the NCC may be used as keys used during the RRC connection resume process.

When the UE moves within the RNA region, the network side is not be notified, and the mobility behavior in the idle state (i.e., the cell selection and reselection principle) will be followed. When the UE moves out of the paging area configured by the RAN, the UE is triggered to resume the RRC connection and re-acquire the paging area configured by the RAN. When downlink data arrives at the UE, the base station that maintains the connection between the RAN and the CN for the UE may trigger all cells in the RAN paging area to transmit a paging message to the UE, so that the UE in the inactive state can resume the RRC connection and receive the data. On the other hand, the UE in the inactive state may be configured with the RAN paging area, the UE in the RAN paging area needs to perform the periodic location update according to the period of the network configuration (implemented based on the RNAU timer), in order to ensure the reachability of the UEs. Therefore, the scenarios where the UE is triggered to perform RNAU may include the expiration of the RNAU timer or the UE moving to an area other than the RNA.

The mobility behavior of the UE in the idle state and the inactive state may follow the cell selection and reselection principle. Specifically, in the process of performing the cell selection and reselection, the UE may define a cell reselection criterion based on frequency priority to satisfy a load balance. In the intra-frequency cell reselection or inter-frequency cell reselection based on frequency priority, an R criterion may be used to perform cell reselection. That is, the cells are sorted according to signal quality, and the cell with the best signal quality may be selected as a candidate reselection target cell. For a cell with a high priority in terms of frequency, as long as the signal quality of the cell meets a certain threshold, the cell with the high frequency priority may be reselected. For a cell with a low f priority in terms of frequency, the cell may be reselected only when the signal quality of the serving cell falls below the certain threshold.

Dual Card Terminal

A dual-card dual-standby mode means that one terminal can simultaneously be mounted with two subscriber identification cards, and both of the two subscriber identification cards are in a standby state. The dual-card dual-standby mode in the market generally may refer to the dual-card dual-standby mode of a same network standard, i.e., a dual-card dual-standby mode of GSM network, or a dual-card dual-standby of CDMA network, etc. A dual-network dual-standby terminal can be inserted with two subscriber identification cards of different networks at the same time, and the two subscriber identification cards may be put in a power-on state at the same time. The subscriber can make and receive calls as well as send and receive short messaging service messages at will without switching the networks.

At present, the capability of the terminal generally does not support a pure dual-pass mode, which refers to dual uplink and downlink (Dual UL/DL). Dual UL/DL means that the UE may transmit uplink data services and downlink data services on two networks through two subscriber identification cards at the same time. In general, most of the current terminals only support Single UL/DL or Single UL/Dual DL, which means that the UE can perform only the services for one subscriber identification card at a certain time.

In 5G, one of the two subscriber identification cards may camp in a LTE cell, another one may camp in a NR cell, or both camp in the NR cell. On the other hand, the two subscriber identification cards may belong to a same operator or may belong to different operators.

At present, the mobility management of two subscriber identification cards may be performed independently. For example, the measurement and mobility behavior of the two subscriber identification cards camping in a cell and in an idle state may be performed independently. In the case where the two subscriber identification cards belong to the same operator, the mobility management of the two subscriber identification cards can be processed combinedly. Therefore, the following technical solutions of the embodiments of the present disclosure are proposed.

FIG. 2 is a flowchart of a method for mobility management according to an embodiment of the present disclosure. As shown in FIG. 2, the method for mobility management includes the following actions of S201 and S202.

In action 201, the terminal determines that mobility management of a first subscriber identification card and a second subscriber identification card can be processed combinedly.

In the embodiment of the present disclosure, the terminal may be any device that can communicate with a network, such as a mobile phone, a tablet computer, a notebook, an in-vehicle terminal, or a wearable device.

In the embodiment of the present disclosure, the terminal supports the dual-card dual-standby mode. Specifically, the terminal may be inserted with two subscriber identification cards, i.e., a first subscriber identification card and a second subscriber identification card. The networks in which the first subscriber identification card and the second subscriber identification card can camp, may be the same type of network, or may be different types of networks. For example, the first subscriber identification may camp in the LTE cell, the second subscriber identification card may camp in the NR cell, or, both the subscriber identification cards may camp in the NR cell.

In the embodiment of the present disclosure, both the first subscriber identification card and the second subscriber identification card may be Subscriber Identification Module (SIM) cards, or may be Universal Subscriber Identity Module (USIM) cards; or, one of the first subscriber identification card and the second subscriber identification card may be a SIM card and another one of the first subscriber identification card and the second subscriber identification card may be a USIM card. The types of the first subscriber identification card and the second subscriber identification card are not be limited in the embodiments of the present disclosure.

It should be noted that the solutions described in the embodiments of the present disclosure take a dual-card mode as an example. The present disclosure is not be limited to this, and is also applicable to the technical solutions of the embodiments of the present disclosure for future multi-card cases. For example, the terminal may be inserted with three subscriber identification cards, i.e., a first subscriber identification card, a second subscriber identification card, and a third subscriber identification card.

In the embodiment of the present disclosure, the terminal may determine whether the mobility management of the first subscriber identification card and the second subscriber identification card can be processed combinedly by determining whether the first subscriber identification card and the second subscriber identification card have an association relationship. In response to the first subscriber identification card and the second subscriber identification card having the association relationship, the terminal may determine that the mobility management of the first subscriber identification card and the second subscriber identification card can be processed combinedly.

Here, the case that the first subscriber identification card and the second subscriber identification card have the association relationship may include the following: 1) a card number corresponding to the first subscriber identification card and a card number corresponding to the second subscriber identification card belong to a same operator; and/or, 2) a core network with which the first subscriber identification card is registered and a core network with which the second subscriber identification card is registered are a same core network, such as a 5G core network (5GC).

In action 202, the terminal transmits first indication information to a network side. The first indication information is used to indicate that the mobility management of the first subscriber identification card and the second subscriber identification card can be processed combinedly.

In the embodiment of the present disclosure, the terminal may transmit the first indication information to the network side for the purpose of enabling the base station to learn that the mobility management of the first subscriber identification card and the second subscriber identification card can be processed combinedly. The terminal may transmit the first indication information to the network side in any one of the following manners of mode 1 and mode 2.

In the mode 1, the terminal may transmit the first indication information to an access and mobility management function (AMF); the first indication information may be transmitted by the AMF to a base station after the first subscriber identification card and the second subscriber identification card enter a connected state. Further, the first indication information may be carried in a registration message or a location update message.

For example, the terminal may indicate in the registration message or the location update message that the mobility management of the first subscriber identification card and the second subscriber identification card can be processed combinedly. The AMF may indicate to the base station that the mobility management of the first subscriber identification card and the second subscriber identification card can be processed combinedly after both the first subscriber identification card and the second subscriber identification enter a connected state.

In an alternative embodiment, in response to the terminal detecting that the first subscriber identification card or the second subscriber identification card is removed from the terminal, the terminal may transmit second indication information to the AMF. The second indication information may be configured to indicate independent processing or cancellation of independent processing of the mobility management on the first subscriber identification card and the second subscriber identification card. Further, the second indication information may be carried in a re-registration message or a location update message.

For example, in response to the terminal detecting that the first subscriber identification card or the second subscriber identification card has been removed from the terminal, the terminal may transmit the location update message or the re-registration message to the AMF, and then may indicate, through the location update message or the re-registration message, that the combined processing on the first subscriber identification card and the second subscriber identification card of the AMF has been canceled (or, terminated).

In the mode 2, after the first subscriber identification card and the second subscriber identification card enter the connected state, the terminal may transmit the first indication information to the base station.

In the embodiment of the present disclosure, when the mobility management of the first subscriber identification card and the second subscriber identification card can be processed combinedly, the terminal may perform the combined processing of the mobility management on the first subscriber identification identity card and the second subscriber identification card.

It should be noted that the processing of the mobility management mainly may include a processing of an Access Stratum (AS). The processing of the AS mainly may include: measurement, cell selection, radio resource management, paging, location update, and the like. Alternatively, the processing of the mobility management may also include processing of the Non-Access Stratum (NAS). The processing of the NAS may mainly include session management, subscriber management, and the like.

In the embodiment of the present disclosure, the combined processing of the mobility management of the first subscriber identification card and the second subscriber identification card may be implemented in the following manners.

Joint Processing of Measurement and Cell Selection and Reselection Evaluation (i.e. Mobility Decision)

Firstly, the terminal may determine a primary card and a secondary card from the first subscriber identification card and the second subscriber identification card. Here, the primary card may be determined in the following manners. 1) The terminal may determine a subscriber identification card with a dedicated mobility control parameter from the first subscriber identification card and the second subscriber identification card, and then use the determined subscriber identification card as the primary card. Alternatively, 2) the terminal may receive second configuration information from the network side, and then determine whether the primary card is the first subscriber identification card or the second subscriber identification card based on the second configuration information. Alternatively, 3) the terminal may determine that the primary card is the first subscriber identification card or the second subscriber identification card based on an implementation of the terminal. Here, the secondary card may also be referred to as a non-primary card.

For example, the terminal may decide which of two USIM cards is the primary card (and another card is naturally the secondary card), and the primary card may decide the measurement and mobility of the primary cell. The USIM card with the dedicated mobility control parameter may be used as the primary card, or the AMF or the base station may configure one of the two USIM cards as the primary card, or the terminal may determine which of the two USIM cards is the primary card based on the implementation of the terminal.

The Terminal is in an Idle State or an Inactive State

The terminal may ignore or disable a mobility measurement operation and a cell selection reselection evaluation operation corresponding to the secondary card. A cell in which the secondary card camps may be determined based on a cell in which the primary card camps.

Here, the mobility measurement operation and the cell selection reselection evaluation operation corresponding to the secondary card may be the mobility measurement operation and the cell selection reselection evaluation operation of the cell in which the secondary camps. The cell in which the secondary card camps and the target cell for reselection may change with the cell in which the primary card camps and the target cell for reelection. That is, the cell in which the primary card camps is the cell in which the secondary card camps.

Here, the terminal being in the idle state or the inactive state means that the first subscriber identification card and the second subscriber identification card are in the idle state or the inactive state.

The Terminal is in a Connected State

The terminal may ignore or disable the mobility measurement configuration corresponding to the secondary card. The terminal may receive third indication information from the base station, and the third indication information may be configured to indicate that the terminal needs to simultaneously switch the primary card and the secondary card to a same target cell. And the primary card and the secondary card may correspond to same radio resource configuration.

Here, the mobility measurement configuration corresponding to the secondary may be connected-state mobility measurement configuration of the serving cell in which the secondary card is located. The base station may simultaneously perform switchings of the primary card and the secondary card to the same target cell, and may configure the same radio resource configuration.

In an alternative embodiment, the terminal may receive first configuration information from the base station, the first configuration information may be configured to determine mobility measurement configuration corresponding to the primary card. In a specific implementation, in response to the terminal or the AMF indicating to the base station that the mobility management of the two cards can be processed combinedly, the base station may configure the corresponding mobility measurement configuration for only one of the two cards (generally the primary card).

It should be noted that since the terminal is in the connected state, the mobility measurement configuration configured by the base station is the mobility measurement configuration in the connected state.

In an alternative embodiment, the terminal may transmit fourth indication information to the base station. The fourth indication information may be configured to request to simultaneously perform switchings of a primary card and a secondary card, and/or, the fourth indication information may be configured to configure same radio resource configuration for the primary card and the secondary card. Further, the fourth indication information may be carried in a measurement report message or a terminal auxiliary information message.

For example, through the fourth indication information, the terminal may request the base station to perform the radio resource control (RRC) connection corresponding to the two cards to perform the synchronous handover and/or request the base station to configure the same radio resource configuration for the RRC connection corresponding to the two cards. The terminal may carry the fourth indication information in a measurement report message or a terminal auxiliary information message.

Here, the terminal being in the connected state means that the first subscriber identification card and the second subscriber identification card are in the connected state.

Combined Processing of Location Update

In response to the terminal being in an inactive state, the terminal may receive an RRC release message from the base station, and the RRC release message may carry third configuration information and fifth indication information. The third configuration information may be used to determine an inactive-state configuration parameter, and the fifth indication information may be used to indicate that the inactive-state configuration parameter is applicable to the first subscriber identification card and the second subscriber identification card. The terminal may perform location update of the first subscriber identification card and the second subscriber identification card based on the RRC release message.

Here, the terminal being in the inactive state means that the first subscriber identification card and/or the second subscriber identification card are in the inactive state.

Here, the inactive-state configuration parameter may include at least one of a redirect configuration parameter or a mobility control parameter.

Here, the operation of performing the location update of the first subscriber identification card and the second subscriber identification card may include performing at least one of a periodic tracking area update (TAU) of the first subscriber identification card and the second subscriber identification card, or a cross-border TAU of the first subscriber identification card and the second subscriber identification card.

In a specific implementation, after the base station learns that the mobility management of the first subscriber identification card and the second subscriber identification card can be processed combinedly, in response to one of the two cards being in the inactive state or both the cards being in the inactive state, the base station may configure the inactive-state configuration parameters through the RRC release message, and may carry the fifth indication information in the RRC release message. The fifth indication information may be used to indicate that the inactive-state configuration parameters are applicable to the two cards during the combined processing. After receiving the RRC release message, the terminal may acquire the inactive-state configuration parameter for combined processing, and may perform the periodic TAU of the two cards, and/or, the cross-border TAU of the two cards based on the inactive-state configuration parameter.

In an alternative embodiment, the terminal may transmit an RRC resume request message to the base station, and the RRC resume request message may carry sixth indication information. The sixth indication information is used to indicate that the terminal supports the combined processing of the mobility management on the first subscriber identification card and the second subscriber identification card. As such, the base station may select to perform the combined processing. A combined processing relationship of the two cards (i.e., whether the two cards can be processed combinedly or cannot be processed combinedly) or the configuration of the two cards may be stored in the inactive-state AS context of the terminal.

Combined Processing of RAN Paging and RNAU

When the terminal is in the inactive state, a first event and a second event may occur simultaneously, the first event may be that the terminal receives a first paging message for the first subscriber identification card, and the first paging message may be triggered by an access network; and the second event may be a radio access network (RAN) notification area update (RNAU) event. The terminal may transmit an RRC resume request message to the base station, where the RRC resume request message may carry seventh indication information, and the seventh indication information may be used to indicate performing an RNAU while responding to the first paging message.

Here, the terminal being in the inactive state means that the first subscriber identification card and the second subscriber identification card are in the inactive state.

In an alternative embodiment, the RRC resume request message may further carry fourth configuration information. The fourth configuration information is used to determine the inactive-state configuration information of the second subscriber identification card.

For example, if both the USIM cards (USIM A and USIM B) are in the inactive state, and USIM A RAN paging (i.e., the first event) and USIM B RNAU (i.e., the second event) occur simultaneously, the USIM A may perform combined processing on the RNAU of the USIM B while responding to the paging. That is, the terminal may carry seventh indication information in the RRC resume request message, and the seventh indication information may be used to indicate combined processing of USIM A RAN paging and USIM B RNAU. Alternatively, the terminal may carry the suspension configuration information of the USIM B (i.e., the inactive configuration information) in the RRC resume request message. Thus, the RNAU of the USIM B may end, and the USIM A may continue to execute the RRC resume process response RAN paging.

When the terminal is in the inactive state, the first event and the second event may occur simultaneously, the first event may be that the terminal receives the first paging message for the first subscriber identification card, and the first paging message may be triggered by the access network; and the second event may be the RNAU event. In response to a priority of the first event being higher than a priority of the second event, the terminal may perform the RNAU after responding to the first paging message; and in response to the priority of the second event being higher than the priority of the first event, the terminal may respond to the first paging message after performing the RNAU.

Here, the terminal being in the inactive state means that the first subscriber identification card and the second subscriber identification card are in the inactive state.

For example, if both the USIM cards (USIM A and USIM B) are in an inactive state, and the USIM A RAN paging (i.e., the first event) and the USIM B RNAU (i.e., the second event) occur simultaneously, the priority of the USIM B RNAU may be higher than that of the USIM A RAN paging, and the USIM B RNAU may be preferentially executed, and then the USIM A RAN paging may be responded. Alternatively, the priority of the USIM A RAN paging may be higher than the priority of the USIM B RNAU, the USIM A RAN paging may be preferentially responded, and then the USIM B RNAU may be executed.

Combined Processing of Access Control

In a case that both the first subscriber identification card and the second subscriber identification card are required to access the network side at the same time, in response to a service priority corresponding to the first subscriber identification card being higher than a service priority corresponding to the second subscriber identification card, the terminal may perform an access control operation corresponding to the second subscriber identification card after completing an access control operation corresponding to the first subscriber identification card. In response to the service priority corresponding to the second subscriber identification card being higher than the service priority corresponding to the first subscriber identification card, the terminal may perform the access control operation corresponding to the first subscriber identification card after completing the access control operation corresponding to the second subscriber identification card. An access result corresponding to the first subscriber identification card may be independent of an access result corresponding to the second subscriber identification card.

For example, the USIM A and the USIM B may both have requirements for accessing the network side. If the service priority of the USIM A is higher than that of the USIM B, the USIM A is barred after completing a same access control (UAC) operation, and the USIM B may continue to perform the UAC operation. If the UAC is passed, the USIM B may access the network. It can be seen that the UAC operation of the USIM B is not be affected by the access result of the USIM A.

Combined Processing of CN Paging and RAN Paging

Here, the CN paging may be the paging triggered by the core network, and the RAN paging may be the paging triggered by the access network.

When a third event and a fourth event occur simultaneously, the third event may be that the terminal receives a first paging message for the first subscriber identification card, and the first paging message may be triggered by a core network. The fourth event may be that the terminal receives a second paging message for the second subscriber identification card, and the second paging message may be triggered by the access network. 1) In response to a service priority corresponding to the first paging message being higher than a service priority corresponding to the second paging message, the terminal may respond to the first paging message; in response to the service priority corresponding to the second paging message being higher than the service priority corresponding to the first paging message, the terminal may respond to the second paging message. Or, 2) the terminal may respond to the first paging message. Or, 3) the terminal may respond to the second paging message.

For example, when the USIM A CN paging (i.e., the third event) and the USIM B RAN paging (i.e., the fourth event) occur at the same time, the terminal may select a USIM card for which the paging message is to be responded to, according to the service priority of the paging message. Specifically, the terminal may select the paging message with a high priority to be responded to. Alternatively, if the priority of the RAN paging is defined to be higher than the priority of the CN paging, the terminal can directly respond to the USIM B RAN paging without determination. Alternatively, if the priority of the CN paging is defined to be higher than the priority of the RAN paging, the terminal can directly respond to the USIM A CN paging without determination.

It should be noted that the base station in the embodiment of the present disclosure may be a 5G base station (that is, a gNB) or a 4G base station (that is, an eNB). A specific implementation of the base station is not be limited in the embodiment of the present disclosure.

FIG. 3 is a schematic structural diagram of an apparatus for mobility management according to an embodiment of the present disclosure. As shown in FIG. 3, the apparatus for mobility management includes a determination unit 301 and a transmission unit 302.

The determination unit 301 is configured to determine that mobility management of a first subscriber identification card and a second subscriber identification card can be processed combinedly.

The transmission unit 302 is configured to transmit first indication information to a network side, where the first indication information is used to indicate that the mobility management of the first subscriber identification card and the second subscriber identification card can be processed combinedly.

In an embodiment, the determination unit 301 may further be configured to determine whether the first subscriber identification card and the second subscriber identification card have an association relationship. In response to the first subscriber identification card and the second subscriber identification card having the association relationship, the determination unit 301 may further be configured to determine that the mobility management of the first subscriber identification card and the second subscriber identification card can be processed combinedly.

In an embodiment, the first subscriber identification card and the second subscriber identification card have the association relationship may include at least one of the following:

a card number corresponding to the first subscriber identification card and a card number corresponding to the second subscriber identification card belong to a same operator; or a core network with which the first subscriber identification card is registered and a core network with which the second subscriber identification card is registered are a same core network.

In an embodiment, the transmission unit 302 may be configured to transmit the first indication information to an access and mobility management function (AMF). The first indication information may be transmitted by the AMF to a base station after the first subscriber identification card and the second subscriber identification card enter a connected state.

In an embodiment, the first indication information may be carried in a registration message or a location update message.

In an embodiment, in response to the terminal detecting that the first subscriber identification card or the second subscriber identification card is removed from the terminal, the transmission unit 302 may be further configured to transmit second indication information to the AMF. The second indication information may be used to indicate independent processing of the mobility management on the first subscriber identification card and the second subscriber identification card, or, the second indication information may be used to indicate cancelling combined processing of the mobility management on the first subscriber identification card and the second subscriber identification card.

In an embodiment, the transmission unit 302 may be configured to transmit the first indication information to a base station after the first subscriber identification card and the second subscriber identification card enter a connected state.

In an embodiment, the apparatus may further include a processing unit 303.

The processing unit 303 may be configured to perform combined processing of the mobility management on the first subscriber identification card and the second subscriber identification card.

In an embodiment, in response to the terminal being in an idle state or an inactive state, the processing unit 303 may be configured to ignore or disable a mobility measurement operation and a cell selection reselection evaluation operation corresponding to a secondary card, where a cell in which the secondary card camps is determined based on a cell in which a primary card camps.

In an embodiment, in response to the terminal being in a connected state, the processing unit 303 may be configured to ignore or disable, mobility measurement configuration corresponding to a secondary card. And the processing unit 303 may be further configured to receive third indication information from the base station, where the third indication information may be used to indicate that the terminal needs to simultaneously switch a primary card and the secondary card to a same target cell, and the primary card and the secondary card may correspond to same radio resource configuration In an embodiment, the apparatus may further include a receiving unit 304.

The receiving unit 304 may be configured to receive, in response to the terminal being in a connected state, first configuration information from a base station, where the first configuration information may be used to determine mobility measurement configuration corresponding to a primary card.

In an embodiment, in response to the terminal being in a connected state, the transmission unit 302 may be configured to transmit fourth indication information to a base station, where the fourth indication information may be used to request to simultaneously perform switchings of a primary card and a secondary card, and/or, the fourth indication information may be used to configure same radio resource configuration for the primary card and the secondary card.

In an embodiment, the fourth indication information may be carried in a measurement report message or a terminal auxiliary information message.

In an embodiment, the determination unit 301 may be configured to determine the primary card and the secondary card from the first subscriber identification card and the second subscriber identification card.

In an embodiment, the determining unit 301 may be configured to determine a subscriber identification card with a dedicated mobility control parameter from the first subscriber identification card and the second subscriber identification card, and use the subscriber identification card as the primary card. Or, the determination unit 301 may be further configured to receive second configuration information from the network side, and determine whether the primary card is the first subscriber identification card or the second subscriber identification card based on the second configuration information. Or, the determination unit 301 may be further configured to determine that the primary card is the first subscriber identification card or the second subscriber identification card based on an implementation of the terminal.

In an embodiment, the apparatus may further include a receiving unit 304, configured to receive, in response to the terminal being in an inactive state, a radio resource control (RRC) release message from a base station. The RRC release message may carry third configuration information and fifth indication information. The third configuration information may be used to determine an inactive-state configuration parameter, and the fifth indication information may be used to indicate that the inactive-state configuration parameter is applicable to the first subscriber identification card and the second subscriber identification card.

The processing unit 303 may be configured to perform location update of the first subscriber identification card and the second subscriber identification card based on the RRC release message.

In one embodiment, the inactive-state configuration parameter may include at least one of a redirect configuration parameter or a mobility control parameter.

In an embodiment, the processing unit 303 may be configured to perform at least one of a periodic tracking area update (TAU) of the first subscriber identification card and the second subscriber identification card, or a cross-border TAU of the first subscriber identification card and the second subscriber identification card.

In an embodiment, the transmission unit 302 may be configured to transmit an RRC resume request message to the base station, where the RRC resume request message carries sixth indication information, and the sixth indication information is used to indicate that the terminal supports the combined processing of the mobility management on the first subscriber identification card and the second subscriber identification card.

In an embodiment, when the terminal is in an inactive state, a first event and a second event may occur simultaneously. The first event may be that the terminal receives a first paging message for the first subscriber identification card, and the first paging message may be triggered by an access network. The second event may be a radio access network (RAN) notification area update (RNAU) event.

The transmission unit 302 may be configured to transmit an RRC resume request message to the base station, where the RRC resume request message carries seventh indication information, and the seventh indication information is used to indicate to perform an RNAU while responding to the first paging message.

In an embodiment, the RRC resume request message may further carry fourth configuration information, and the fourth configuration information is used to determine inactive-state configuration information of the second subscriber identification card.

In an embodiment, when the terminal is in an inactive state, a first event and a second event may occur simultaneously. The first event may be that the terminal receives a first paging message for the first subscriber identification card, and the first paging message may be triggered by an access network; and the second event may be an RNAU event.

In response to a priority of the first event being higher than a priority of the second event, the processing unit 303 may be configured to perform the RNAU after responding to the first paging message. And in response to the priority of the second event being higher than the priority of the first event, the processing unit 303 may be configured to respond to the first paging message after performing the RNAU.

In an embodiment, in a case that both the first subscriber identification card and the second subscriber identification card are required to access the network side at the same time, in response to a service priority corresponding to the first subscriber identification card being higher than a service priority corresponding to the second subscriber identification card, the processing unit 303 may be configured to perform an access control operation corresponding to the second subscriber identification card after completing an access control operation corresponding to the first subscriber identification card; and in response to the service priority corresponding to the second subscriber identification card being higher than the service priority corresponding to the first subscriber identification card, the processing unit 303 may be configured to perform the access control operation corresponding to the first subscriber identification card after completing the access control operation corresponding to the second subscriber identification card. An access result corresponding to the first subscriber identification card may be independent of an access result corresponding to the second subscriber identification card.

In an embodiment, when a third event and a fourth event occur simultaneously, the third event may be that the terminal receives a first paging message for the first subscriber identification card, and the first paging message may be triggered by a core network. The fourth event may be that the terminal receives a second paging message for the second subscriber identification card, and the second paging message may be triggered by an access network.

In response to a service priority corresponding to the first paging message being higher than a service priority corresponding to the second paging message, the processing unit 303 may be configured to respond to the first paging message. In response to the service priority corresponding to the second paging message being higher than the service priority corresponding to the first paging message, the processing unit 303 may be configured to respond to the second paging message. Or, the processing unit 303 may be configured to respond to the first paging message. Or, the processing unit 303 may be configured to respond to the second paging message.

A person skilled in the art should understand that the description of the apparatus for mobility management described above in the embodiments of the present application may be understood with reference to the description of the mobility management method in the embodiments of the present application.

Figure 4:
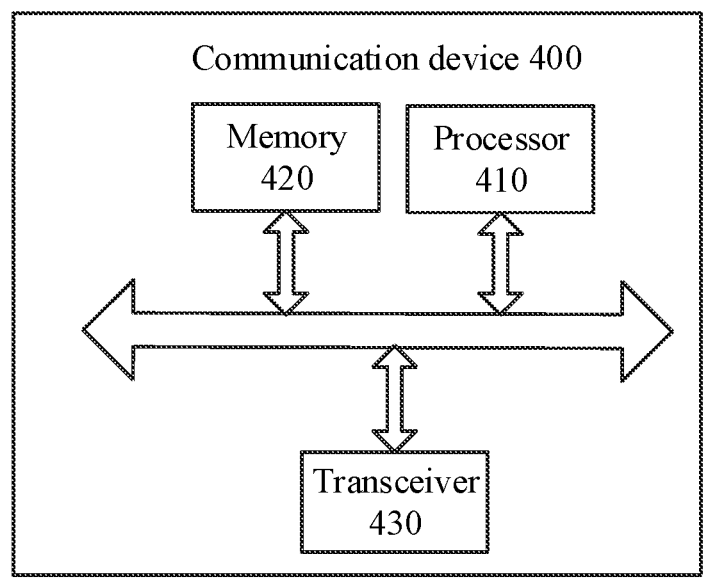
FIG. 4 is a schematic structural diagram of a communication device according to an embodiment of the present disclosure.

FIG. 4 is a schematic structural diagram of a communication device 400 according to an embodiment of the present disclosure. The communication device may be a terminal or a network device. The communication device 400 shown in FIG. 4 may include a processor 410 that may call and execute a computer program from a memory to implement the method in the embodiments of the present disclosure.

Alternatively, as shown in FIG. 4, the communication device 400 may include a memory 420. The processor 410 may call and execute the computer program from the memory 420 to implement the method in the embodiments of the present disclosure.

The memory 420 may be a separate device independent of the processor 410, or may be integrated into the processor 410.

Alternatively, as shown in FIG. 4, the communication device 400 may further include a transceiver 430 that may be controlled by the processor 410 to communicate with other devices, in particular to transmit information or data to other devices, or receive information or data from other devices.

The transceiver 430 may include a transmitter and a receiver. The transceiver 430 may further include an antenna; the number of antennas may be one or more.

Alternatively, the communication device 400 may be specifically the network device of the embodiment of the disclosure, and the communication device 400 may implement a corresponding flow implemented by the network device in each method of the embodiments of the disclosure. For brevity, details are not described herein.

Alternatively, the communication device 400 may be specifically a mobile terminal/terminal according to the embodiments of the disclosure, and the communication device 400 may implement a corresponding flow implemented by the mobile terminal/terminal in each of the methods of the embodiments of the disclosure. For brevity, details are not described herein.

Figure 5:
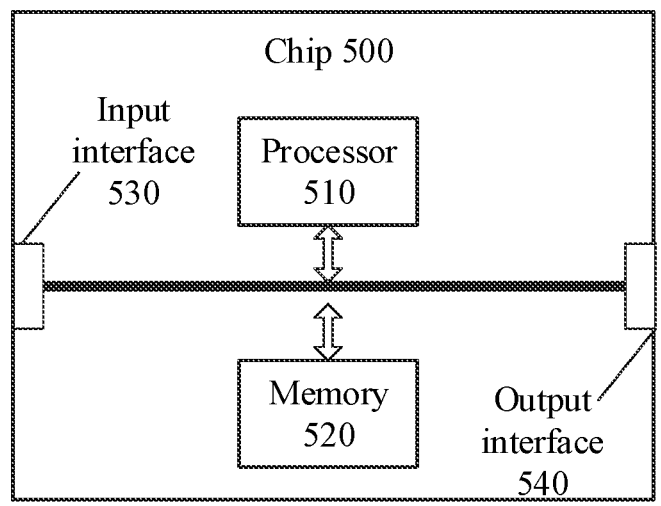
FIG. 5 is a schematic structural diagram of a chip according to an embodiment of the present disclosure.

FIG. 5 is a schematic structural diagram of a chip according to an embodiment of the present disclosure. The chip 500 shown in FIG. 5 includes a processor 510 that may call and execute a computer program from a memory to implement the method of the embodiment of the present disclosure.

Alternatively, as shown in FIG. 5, the chip 500 may further include a memory 520. The processor 510 may call and execute the computer program from the memory 520 to implement the method in the embodiment of the present disclosure.

The memory 520 may be a separate device independent of the processor 510, or may be integrated into the processor 510.

Alternatively, the chip 500 may further include an input interface 530. The processor 510 may control the input interface 530 to communicate with other devices or chips. Specifically, the input interface 530 may acquire information or data transmitted by the other devices or chips.

Alternatively, the chip 500 may further include an output interface 540. The processor 510 may control the output interface 540 to communicate with other devices or chips.

Specifically, the output interface 540 may output information or data to other devices or chips.

Alternatively, the chip may be applied to the network device in the embodiments of the present disclosure, and the chip may implement a corresponding flow implemented by the network device in each of the methods in the embodiments of the present disclosure. For brevity, details are not described herein.

Alternatively, the chip may be applied to the mobile terminal/terminal in the embodiments of the present disclosure, and the chip may implement the corresponding flow implemented by the mobile terminal/terminal in the method of the embodiment of the present disclosure. For brevity, details are not described herein.

It should be understood that the chip mentioned in the embodiments of the present disclosure may also be referred to as a system-level-chip, a system chip, a chip system, or a system-on-a-chip.

Figure 6:
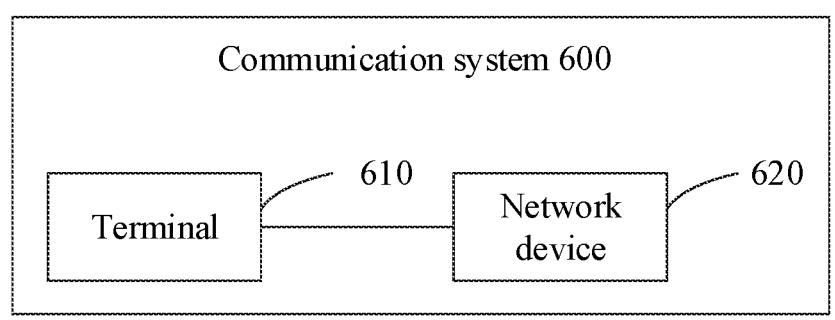
FIG. 6 is a schematic block diagram of a communication system according to an embodiment of the present disclosure.

FIG. 6 is a schematic block diagram of a communication system according to an embodiment of the present disclosure. As shown in FIG. 6, the communication system 600 may include a terminal 610 and a network device 620.

The terminal 610 may be configured to implement corresponding functions implemented by the terminal in the aforementioned method; and the network device 620 may be configured to implement corresponding functions implemented by the network device in the aforementioned method. For brevity, details are not described herein.

Embodiments of the present disclosure provide a method, apparatus, and terminal for mobility management.

A method for mobility management provided in an embodiment of the present disclosure includes the following operations.

A terminal determines that mobility management of a first subscriber identification card and a second subscriber identification card can be jointly processed.

The terminal transmits first indication information to a network side, wherein the first indication information is used to indicate that the mobility management of the first subscriber identification card and the second subscriber identification card can be processed combinedly.

An apparatus for mobility management provided in an embodiment of the present disclosure includes a determination unit and a transmission unit.

The determination unit is configured to determine that mobility management of a first subscriber identification card and a second subscriber identification card can be processed combinedly; and The transmission unit is configured to transmit first indication information to a network side, wherein the first indication information is used to indicate that the mobility management of the first subscriber identification card and the second subscriber identification card can be processed combinedly.

A terminal provided by an embodiment of the present disclosure includes a processor and a memory. The memory is configured for storing a computer program, and the processor is configured to call and execute the computer program stored in the memory to perform the method for mobility management described above.

An embodiment of the present disclosure provides a chip for performing the method for mobility management described above.

Specifically, the chip includes a processor, which is configured to call and execute a computer program from a memory, such that a device on which the chip is mounted performs the method for mobility management described above.

A computer-readable storage medium provided by an embodiment of the present disclosure for storing a computer program that causes a computer to perform the method for mobility management described above.

A computer program product provided by an embodiment the present disclosure includes computer program instructions that cause a computer to perform the method for mobility management described above.

A computer program provided by an embodiment of the present disclosure, when run on a computer, causes the computer to perform the method for mobility management described above.

According to the technical solutions of the embodiments of the present disclosure, in the scenario of dual-subscriber identification cards (abbreviated as a dual-card), if the two subscriber identification cards have an association relationship (e.g., belonging to the same operator), the mobility management of the two subscriber identification cards can be processed combinedly, so that redundant action behaviors can be avoided, signaling overhead can be reduced, and power saving can be achieved.

It should be understood that the processor of the embodiment of the present disclosure may be an integrated circuit chip with a capability for processing signals. In the implementation, the steps of the above method embodiments may be accomplished by integrated logic circuitry of hardware in the processor or instructions in the form of software. The aforementioned processor may be a general purpose processor, a digital signal processor (DSP), an application specific integrated circuit (ASIC), a field programmable gate array (FPGA) or other programmable logic devices, a discrete gate or a transistor logic device, or a discrete hardware component. The methods, steps, and logical block diagrams disclosed in the embodiments of the present disclosure may be implemented or performed. The general purpose processor may be a microprocessor, or the processor may be any conventional processor or the like. The steps of the method disclosed in connection with the embodiments of the present disclosure may be directly performed by a hardware decoding processor or performed by a combination of hardware and software modules in the decoding processor. The software module may be located in a mature storage medium in the art, such as a random access memory, a flash memory, a read-only memory, a programmable read-only memory, or an electrically erasable programmable memory, a register, or the like. The storage medium may be located in the memory, and the processor may read the information in the memory and complete the steps of the method in combination with the hardware.

It is understood that the memory in the embodiments of the present disclosure may be a volatile memory or a non-volatile memory, or may include both the volatile and the non-volatile memory. The non-volatile memory may be a read-only memory (ROM), a programmable read-only memory (Programmable ROM), an erasable programmable read-only memory (Erasable PROM), an electrically erasable programmable read-only memory (Electrically EPROM), or a flash memory. The volatile memory may be a Random Access Memory (RAM) that functions as an external cache. By way of example, but not limitation, many forms of RAM may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a sync link dynamic random access memory (Sync Link DRAM, SLDRAM), and a direct memory bus random access memory (Direct Rambus RAM, DR RAM). It should be noted that the memories of the systems and methods described herein are intended to include, but are not limited to, these and any other suitable types of memories.

It should be understood that the above-described memory is exemplary but not limiting. For example, the memory in the embodiment of the present disclosure may also be a static random access memory (static RAM), a dynamic random access memory (dynamic RAM), a synchronous dynamic random access memory (synchronous DRAM), a double data rate synchronous dynamic random access memory (double data rate SDRAM), an enhanced synchronous dynamic random access memory (enhanced SDRAM, ESDRAM), a synchronous connection dynamic random access memory (synch link DRAM, SLDRAM), a direct memory bus random access memory (Direct Rambus RAM, DR RAM), or the like. That is, the memory in this application embodiment is intended to include, but is not limited to, these and any other suitable types of memory.

Embodiments of the present disclosure further provide a computer-readable storage medium for storing a computer program.

Alternatively, the computer-readable storage medium may be applied to the network device in the embodiments of the present disclosure, and the computer program causes a computer to perform the corresponding processes implemented by the network device in the methods in the embodiments of the present disclosure. For brevity, details are not described herein.

Alternatively, the computer-readable storage medium may be applied to the mobile terminal/terminal in the embodiments of the present disclosure, and the computer program causes the computer to perform the corresponding processes implemented by the mobile terminal/terminal in the methods of the embodiments of the present disclosure. For brevity, details are not described herein.

Embodiments of the present disclosure further provide a computer program product including computer program instructions.

Alternatively, the computer program product may be applied to the network device in the embodiments of the present disclosure, and the computer program instruction causes the computer to perform the corresponding processes implemented by the network device in the methods in the embodiments of the present disclosure. For brevity, details are not described herein.

Alternatively, the computer program product may be applied to the mobile terminal/terminal in the embodiments of the present disclosure, and the computer program instruction causes the computer to perform the corresponding processes implemented by the mobile terminal/terminal in the methods of the embodiments of the present disclosure. For brevity, details are not described herein.

Embodiments of the present disclosure further provide a computer program.

Alternatively, the computer program may be applied to the network device in the embodiment of the present disclosure. When the computer program runs on a computer, the computer performs the corresponding processes implemented by the network device in the methods in the embodiments of the present disclosure. For brevity, details are not described herein.

Alternatively, the computer program may be applied to the mobile terminal/terminal in the embodiment of the present disclosure. When the computer program runs on a computer, the computer performs the corresponding processes implemented by the mobile terminal/terminal in the methods in the embodiments of the present disclosure. For brevity, details are not described herein.

Those of ordinary skill in the art will appreciate that the units and algorithm steps of the examples described in connection with the embodiments disclosed herein can be implemented in electronic hardware, or a combination of computer software and electronic hardware. Whether these functions are performed in hardware or software depends on the particular application and design constraints of the technical solutions. Those of ordinary skill in the art may implement the described functions using different methods for each particular application, but such implementation should not be considered beyond the scope of the present disclosure.

Those skilled in the art will clearly understand that, for convenience and brevity of the description, references may be made to the corresponding process in the foregoing method embodiments for the detailed working processes of the system, apparatus and unit described above.

In the several embodiments provided herein, it should be understood that the disclosed systems, apparatus, and methods may be implemented in other ways. For example, the apparatus embodiments described above are merely illustrative. For example, the division of the unit is merely a logical function division, and may be implemented in other ways, e.g., multiple units or components may be combined or integrated into another system, or some features may be ignored or not performed. Alternatively, the shown or discussed mutual coupling, direct coupling or communication connection to one another may be via some interface, devices or units, which may be implemented in electrical, mechanical or other forms.

The units described as separate parts may or may not be physically separate, and the parts displayed as units may or may not be physical units, i.e. may be located in one place, or may be distributed over a plurality of network units. Some or all of the units may be selected according to actual needs to achieve the purpose of the present embodiment solution.

In addition, the functional units in the various embodiments of the present disclosure may be integrated in one processing unit, or each unit may exist alone physically, or two or more units may be integrated in one unit.

If the function is implemented in the form of a software functional unit and sold or used as an independent product, it can be stored in a computer readable storage medium. Based on such an understanding, the technical solution of the present disclosure can be embodied in the form of a software product in essence or the part that contributes to the existing technology or the part of the technical solution. The computer software product is stored in a storage medium and includes a number of instructions to enable a computer device (which may be a personal computer, a server, or a network device, etc.) to perform all or part of the steps of the methods described in the various embodiments of the present disclosure. The aforementioned storage media include a USB flash drive, a removable hard disk, a read-only memory (Read-Only Memory) ROM, a random access memory (RAM), a magnetic disk, or an optical disc, which can store program code.

The foregoing description is merely a specific implementation of the present disclosure, but the scope of protection of the present disclosure is not limited thereto. Any change or replacement readily contemplated by a person skilled in the art within the technical scope disclosed in the present application shall fall within the scope of protection of the present disclosure. Therefore, the scope of protection of the present application shall be subject to the scope of protection of the claims.

The invention claimed is:

1. A method for mobility management, comprising:
    determining, by a terminal, that mobility management of a first subscriber identification card and a second subscriber identification card can be processed combinedly; and
    transmitting, by the terminal, first indication information to a network side, wherein the first indication information is used to indicate that the mobility management of the first subscriber identification card and the second subscriber identification card can be processed combinedly,
    wherein the transmitting, by the terminal, the first indication information to the network side comprises:
    transmitting, by the terminal, the first indication information to an access and mobility management function (AMF), wherein the first indication information is transmitted by the AMF to a base station after the first subscriber identification card and the second subscriber identification card enter a connected state,
    wherein the first indication information is carried in a location update message,
    wherein the method further comprises:
    performing, by the terminal, combined processing of the mobility management on the first subscriber identification card and the second subscriber identification card,
    wherein the performing, by the terminal, the combined processing of the mobility management on the first subscriber identification card and the second subscriber identification card comprises:
    in response to the terminal being in an inactive state, receiving by the terminal, a radio resource control (RRC) release message from the base station, wherein the RRC release message carries third configuration information and fifth indication information, wherein the third configuration information is used to determine an inactive-state configuration parameter and the fifth indication information is used to indicate that the inactive-state configuration parameter is applicable to the first subscriber identification card and the second subscriber identification card; and
    performing, by the terminal, location update of the first subscriber identification card and the second subscriber identification card based on the RRC release message.

2. The method of claim 1, wherein the determining, by the terminal, that the mobility management of the first subscriber identification card and the second subscriber identification card can be processed combinedly comprises:
    determining, by the terminal, whether the first subscriber identification card and the second subscriber identification card have an association relationship; and
    in response to the first subscriber identification card and the second subscriber identification card having the association relationship, determining, by the terminal, that the mobility management of the first subscriber identification card and the second subscriber identification card can be processed combinedly.

3. The method of claim 2, wherein the first subscriber identification card and the second subscriber identification card have the association relationship, comprises at least one of:
    a card number corresponding to the first subscriber identification card and a card number corresponding to the second subscriber identification card belong to a same operator; or
    a core network with which the first subscriber identification card is registered and a core network with which the second subscriber identification card is registered are a same core network.

4. The method of claim 1, wherein the method further comprises:
    in response to the terminal detecting that the first subscriber identification card or the second subscriber identification card is removed from the terminal, transmitting, by the terminal, second indication information to the AMF, wherein the second indication information is used to indicate independent processing of the mobility management on the first subscriber identification card and the second subscriber identification card, or, the second indication information is used to indicate to cancel combined processing of the mobility management on the first subscriber identification card and the second subscriber identification card.

5. The method of claim 1, wherein the performing, by the terminal, the combined processing of the mobility management on the first subscriber identification card and the second subscriber identification card further comprises:
    in response to the terminal being in an idle state or the inactive state, ignoring or disabling, by the terminal, a mobility measurement operation and a cell selection reselection evaluation operation corresponding to a secondary card, wherein a cell in which the secondary card camps is determined based on a cell in which a primary card camps.

6. The method of claim 1, wherein the performing, by the terminal, the combined processing of the mobility management on the first subscriber identification card and the second subscriber identification card further comprises:
    in response to the terminal being in the connected state, ignoring or disabling, by the terminal, mobility measurement configuration corresponding to a secondary card; and
    receiving, by the terminal, third indication information from the base station, wherein the third indication information is used to indicate that the terminal needs to simultaneously switch a primary card and the secondary card to a same target cell, and the primary card and the secondary card correspond to same radio resource configuration.

7. The method of claim 1, wherein the method further comprises at least one of the following:
    in response to the terminal being in the connected state, receiving, by the terminal, first configuration information from the base station, wherein the first configuration information is used to determine mobility measurement configuration corresponding to a primary card, or,
    in response to the terminal being in the connected state, transmitting, by the terminal, fourth indication information to the base station, wherein the fourth indication information is used to perform at least one of: requesting to simultaneously perform switchings of a primary card and a secondary card, or, configuring same radio resource configuration for the primary card and the secondary card, wherein the fourth indication information is carried in a measurement report message or a terminal auxiliary information message.

8. The method of claim 6, further comprising:
determining, by the terminal, the primary card and the secondary card from the first subscriber identification card and the second subscriber identification card.

9. The method of claim 6, wherein the determining, by the terminal, the primary card and the secondary card from the first subscriber identification card and the second subscriber identification card comprises:
determining, by the terminal, a subscriber identification card with a dedicated mobility control parameter from the first subscriber identification card and the second subscriber identification card, and using the subscriber identification card as the primary card; or,
receiving, by the terminal, second configuration information from the network side, and determining, by the terminal, whether the primary card is the first subscriber identification card or the second subscriber identification card based on the second configuration information; or,
determining, by the terminal, that the primary card is the first subscriber identification card or the second subscriber identification card based on an implementation of the terminal.

10. The method of claim 1, wherein the inactive-state configuration parameter comprises at least one of a redirect configuration parameter or a mobility control parameter,
wherein the performing, by the terminal, the location update of the first subscriber identification card and the second subscriber identification card comprises:
performing, by the terminal, at least one of a periodic tracking area update (TAU) of the first subscriber identification card and the second subscriber identification card, or a cross-border TAU of the first subscriber identification card and the second subscriber identification card.

11. The method of claim 1, further comprising:
transmitting, by the terminal, an RRC resume request message to the base station, wherein the RRC resume request message carries sixth indication information, and the sixth indication information is used to indicate that the terminal supports the combined processing of the mobility management on the first subscriber identification card and the second subscriber identification card.

12. The method of claim 1, wherein the performing, by the terminal, the combined processing of the mobility management on the first subscriber identification card and the second subscriber identification card further comprises:
when the terminal is in the inactive state, a first event and a second event occurs simultaneously, wherein the first event is that the terminal receives a first paging message for the first subscriber identification card, and the first paging message is triggered by an access network; and wherein the second event is a radio access network (RAN) notification area update (RNAU) event;
transmitting, by the terminal, an RRC resume request message to the base station, wherein the RRC resume request message carries seventh indication information, and the seventh indication information is used to indicate to perform an RNAU while responding to the first paging message.

13. The method of claim 1, wherein the performing, by the terminal, the combined processing of the mobility management on the first subscriber identification card and the second subscriber identification card further comprises:
when the terminal is in the inactive state, a first event and a second event occur simultaneously, wherein the first event is that the terminal receives a first paging message for the first subscriber identification card, and the first paging message is triggered by an access network; and wherein the second event is an RNAU event;
in response to a priority of the first event being higher than a priority of the second event, performing, by the terminal, the RNAU after responding to the first paging message; and in response to the priority of the second event being higher than the priority of the first event, responding, by the terminal, to the first paging message after performing the RNAU.

14. The method of claim 1, wherein the performing, by the terminal, the combined processing of the mobility management on the first subscriber identification card and the second subscriber identification card further comprises:
in a case that both the first subscriber identification card and the second subscriber identification card are required to access the network side at the same time,
in response to a service priority corresponding to the first subscriber identification card being higher than a service priority corresponding to the second subscriber identification card, performing, by the terminal, an access control operation corresponding to the second subscriber identification card after completing an access control operation corresponding to the first subscriber identification card; and
in response to the service priority corresponding to the second subscriber identification card being higher than the service priority corresponding to the first subscriber identification card, performing, by the terminal, the access control operation corresponding to the first subscriber identification card after completing the access control operation corresponding to the second subscriber identification card;
wherein an access result corresponding to the first subscriber identification card is independent of an access result corresponding to the second subscriber identification card.

15. The method of claim 1, wherein the performing, by the terminal, the combined processing of the mobility management on the first subscriber identification card and the second subscriber identification card further comprises:
when a third event and a fourth event occurs simultaneously, the third event is that the terminal receives a first paging message for the first subscriber identification card, and the first paging message is triggered by a core network; and wherein the fourth event is that the terminal receives a second paging message for the second subscriber identification card, and the second paging message is triggered by an access network;
in response to a service priority corresponding to the first paging message being higher than a service priority corresponding to the second paging message, responding, by the terminal, to the first paging message; in response to the service priority corresponding to the second paging message being higher than the service priority corresponding to the first paging message, responding, by the terminal, to the second paging message; or,
responding, by the terminal, to the first paging message; or
responding, by the terminal, to the second paging message.

16. A terminal comprising a processor and a memory, wherein the memory is configured for storing a computer program, and the processor is configured to call and execute the computer program stored in the memory to:
- determine that mobility management of a first subscriber identification card and a second subscriber identification card can be processed combinedly; and
- transmit first indication information to a network side, wherein the first indication information is used to indicate that the mobility management of the first subscriber identification card and the second subscriber identification card can be processed combinedly, wherein the processor is further configured to call and execute the computer program stored in the memory to:
- transmit the first indication information to an access and mobility management function (AMF), wherein the first indication information is transmitted by the AMF to a base station after the first subscriber identification card and the second subscriber identification card enter a connected state, wherein the first indication information is carried in a location update message, wherein the processor is further configured to call and execute the computer program stored in the memory to:
- in response to the terminal being in an inactive state, receive a radio resource control (RRC) release message from the base station, wherein the RRC release message carries third configuration information and fifth indication information, wherein the third configuration information is used to determine an inactive-state configuration parameter, and the fifth indication information is used to indicate that the inactive-state configuration parameter is applicable to the first subscriber identification card and the second subscriber identification card; and
- perform location update of the first subscriber identification card and the second subscriber identification card based on the RRC release message.

* * * * *